(12) United States Patent
Valade et al.

(10) Patent No.: US 10,232,649 B2
(45) Date of Patent: Mar. 19, 2019

(54) PRINTING SYSTEM FOR PRINTING AN OBJECT HAVING A SURFACE OF VARYING HEIGHT

(71) Applicant: Océ Holding B.V., Venlo (NL)

(72) Inventors: Cédric T. Valade, Villiers sur Marne (FR); Felicia G. Ionascu, Bonneuil-sur-Marne (FR)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/465,905

(22) Filed: Mar. 22, 2017

(65) Prior Publication Data

US 2017/0282608 A1 Oct. 5, 2017

(30) Foreign Application Priority Data

Apr. 5, 2016 (EP) ..................................... 16163896

(51) Int. Cl.
| | |
|---|---|
| *B41J 13/00* | (2006.01) |
| *G06F 3/12* | (2006.01) |
| *B33Y 10/00* | (2015.01) |
| *B33Y 50/00* | (2015.01) |
| *H04N 1/409* | (2006.01) |

(Continued)

(52) U.S. Cl.
CPC ......... *B41J 13/0009* (2013.01); *B29C 64/112* (2017.08); *B29C 64/386* (2017.08); *B33Y 10/00* (2014.12); *B33Y 50/00* (2014.12); *G06F 3/1208* (2013.01); *G06F 3/1256* (2013.01); *H04N 1/4092* (2013.01)

(58) Field of Classification Search
CPC ......... B33Y 30/00; B33Y 10/00; B33Y 50/00; B29C 64/386; G06F 3/1256
See application file for complete search history.

(56) References Cited

U.S. PATENT DOCUMENTS

| | | | | |
|---|---|---|---|---|
| 6,823,230 | B1 * | 11/2004 | Jamalabad | G05B 19/4099 700/119 |
| 8,765,045 | B2 * | 7/2014 | Zinniel | B29C 71/0009 264/341 |

(Continued)

FOREIGN PATENT DOCUMENTS

EP 2 922 029 A2 9/2015

*Primary Examiner* — John Zimmermann
(74) *Attorney, Agent, or Firm* — Birch, Stewart, Kolasch & Birch, LLP

(57) ABSTRACT

The present invention relates to a printer control system and a method for controlling the printing of an object on a support in a number of pass images on top of each other. The object has a surface of varying height. The printer control system comprises a user interface having a display device and arranged to visualize in a window on the display device a preview image before printing of the object. The preview image comprises a representation of the surface of the object. The printer control system further comprises an analysis section which is configured to analyze the pass images in order to predict before printing the object a location of a contouring artefact at the surface of the object, and a transformation section which is configured to transform the predicted location into a contour representation to be added to the preview image. The contour representation is visually distinguishable from the representation of the surface of the object in the preview image.

9 Claims, 14 Drawing Sheets

(51) Int. Cl.
*B29C 64/112* (2017.01)
*B29C 64/386* (2017.01)

(56) References Cited

U.S. PATENT DOCUMENTS

| | | |
|---|---|---|
| 8,976,415 B2 | 3/2015 | Klein Koerkamp et al. |
| 2005/0173838 A1 | 8/2005 | Priedeman, Jr. et al. |
| 2012/0224755 A1* | 9/2012 | Wu .................. G06T 17/00 |
| | | 382/131 |
| 2014/0117585 A1* | 5/2014 | Douglas ............ B29C 47/92 |
| | | 264/401 |
| 2015/0045928 A1* | 2/2015 | Perez ............... B29C 64/112 |
| | | 700/110 |
| 2015/0057780 A1* | 2/2015 | Liu ................ B29C 67/0088 |
| | | 700/98 |
| 2015/0205553 A1 | 7/2015 | Kobayashi |
| 2015/0269289 A1* | 9/2015 | Kim ................ G06F 17/5009 |
| | | 703/6 |
| 2015/0269290 A1* | 9/2015 | Nelaturi ........... G06F 17/5009 |
| | | 703/6 |
| 2016/0236279 A1* | 8/2016 | Ashton ............. B22F 3/1055 |

* cited by examiner

PRINTING SYSTEM FOR PRINTING AN OBJECT HAVING A SURFACE OF VARYING HEIGHT

BACKGROUND OF THE INVENTION

1. Field of the invention

The present invention relates to a printer control system for controlling the printing of an object on a support in a number of pass images on top of each other, the object having a surface of varying height, the printer control system comprising a user interface having a display device and arranged to visualize in a window on the display device a preview image before printing of the object, the preview image comprising a representation of the surface of the object.

The present invention also relates to a printing system for printing of an object on a support in a number of pass images on top of each other, the object having a surface of varying height, the printing system comprising a printer control system according to the invention.

The term "printing" or "print" refers to building an object from print material by additive manufacturing, and includes, in particular, jetting print material for depositing the print material on the support or an already printed portion of the object.

The term "printer control system" and "print controller" refer to the same.

2. Description of the Related Art

Print systems are known that allow printing of multilayer structures that can reach a considerable height as compared to conventionally printed images that are basically flat, or, at least, the height of which is generally disregarded. The structures are generated by stacking layers of material on top of each other. For example, radiation curable ink, in particular UV curable ink, may be used. By repeatedly printing a layer on top of a previously printed, cured layer, a multilayer structure may be built up having a defined height. For example, the height may be up to 10 mm or more. The height, i.e. the thickness of the printed structures, adds an extension in a further dimension to the two dimensional image, and, accordingly, such prints are termed 2.5D prints or relief prints. The printed structure may comprise an image, e.g. a color image.

U.S. Pat. No. 8,976,415 describes a method for generating relief prints, including processing a relief image, comprising color channels for indicating a color of each pixel and a height channel for indicating a height of each pixel, into several passes that are printed using a printer with several colorants including a white colorant. For each pixel a relief part, a white part and a skin part are discriminated. A height variation of individual pixels is caused by repetitive printing of colorants in the relief part. A number of pass images are derived from the relief image to be printed on top of each other. All available colorants may be used in the relief part, in order to provide for an optimal print speed for this part. The skin part comprises pass pixels for which a colorant composition based on the color channels of the relief image is established. Hereinafter the relief part is also mentioned as underground of the object to be printed. Hereinafter the skin part is also mentioned as surface of the object to be printed.

For printing relief prints or 3D prints, an object is built by stacking layers of material on top of each other. A slicing technique is known that consists in decomposing the object into a set of horizontal layers, which are printed on top of each other.

One of the well-known issues of 3D printing is a stair case or contouring effect due to a construction of a print model of the digital object to be printed slice by slice in the field of inkjet additive manufacturing. A problem is that contour lines may be observable only once the print is finished. Printing large size 2.5 D or 3D designs on an inkjet printing system is an expensive and time-consuming operation.

It is an objective of the present invention to provide a printing system facilitate fast printing of relief prints or 3D prints with high surface quality or, in general, enhanced visual print quality of a relief or 3D printed object.

SUMMARY OF THE INVENTION

According to the present invention, this objective is achieved in that wherein the printer control system an analysis section which is configured to analyze the pass images in order to predict before printing the object a location of a contouring artefact at the surface of the object, and a transformation section which is configured to transform the predicted location into a contour representation to be added to the preview image, the contour representation being visually distinguishable from the representation of the surface of the object in the preview image.

The object has a surface of varying height, in particular of a height in a thickness direction or Z-direction that varies over X,Y-coordinates of the support. The height of the pixels corresponds to an extension or thickness of the pixels in the Z-direction. The printed object is composed of slices or pass images printed on top of each other. However, the slices are generally not planar. Rather, different pass pixels of the pass images may be printed on slightly different altitudes, resulting from height variations from previously printed pass images.

The analysis section may comprise a software and/or hardware component that performs an analysis of the stack of layers being generated by the slicing process. The analysis may result in a binary image that represents contouring artifacts as viewed from the top of the printed object.

The transformation section may comprise a 3D visualization software and/or hardware component that exploits the binary image to render the contour artifacts on the surface of the preview image of the object to be printed.

By detecting of the contour artifact on the surface of the object before printing the object and visualizing this contour artifact at the user interface of the printing system, a designer is able to rework the design so that contour artifacts are less visible or an operator/user is able to select another print strategy with less contouring artifacts.

For example, the object may be a relief print, and may be printed on a support in form of a substantially flat substrate.

For example, the object may be at least a part of a 3D structure, and may be printed on a support in form of an other part of the 3D structure or on a support in form of a substantially flat substrate.

The inventors have found that, when pass pixels of different heights are used for building an elevation or relief part of relief prints, visible contouring artifacts can occur on smoothly sloped surfaces of relief prints at positions of contours or borders of comparatively thick relief layers, which have been printed with a maximum pass pixel height, adjacent to stacked thin layers, which have been composed of multiple pass pixels of a low height printed on top of each other. This contouring artifact has been found to be even visible if the thick layers are buried below the surface of the relief print. It is assumed that this undesired effect may be due to different curing behavior of pass pixels of different heights, as well as effects due to droplet satellites, material coalescence or other material effects that influence the additive manufacturing build process, resulting, for a pixel of a given nominal pixel height, in a dependence of the actual height of the printed pixel on the number of pass pixels the printed pixel is composed of, and on the pass pixel heights thereof. This specific contouring effect could be reduced by using only a single, relatively small, uniform pass pixel height. However, in order to speed up the printing process, it is desirable to print underground layers of considerably increased height.

According to an embodiment the analysis section comprises a detection section for detecting before printing of the object intended pause moments in the printing of the pass images, which pause moments lead to the contouring artefact, and the analysis section is configured to couple before printing of the object the intended pause moments to the location of the contouring artefact at the surface of the object.

Pause moments in printing may be introduced by a pausing mechanism when choosing a standard production print strategy. The pausing mechanism has a strong influence on the flatness of the surface. A pause moment in printing is caused by no material deposition at a location in a layer according to the pass image corresponding to the layer or by a variation in the amount of material deposition in a layer with respect to previous layers. Observations and measures show that pausing introduces glossy stripes, so pause moments introduce attenuations in a contouring pattern. For some pixels, the constant vertical resolution of the elevation build up (meaning the same amount of volume being deposited), physically produces micro relief lines and bring more roughness to the surface. The ink jet slicing technique in a production print strategy uses on a maximum volume deposition. It is for example composed of a mixture of Cyan, Magenta, Yellow, Black, White of 30pl droplets (Underground stage of a pixel). This is the stage where a given pixel reaches its highest instantaneous growth speed. For example, a total volume of 25 Elementary Droplet—referred as ED hereinafter—per pass (wherein 1 ED equals 6 pl and is about 1.7 µm high) may be deposited and then reduced to 15 ED, 10 ED and 5 ED to refine with the targeted elevation. Then, when the pixel comes to the white isolation layers, only the White channel contributes to the growth of the pixel by small steps of 1 to 4 ED being deposited (36 ED as total thickness). The outcome of such a building scheme is that each pixel taken separately has a different growth speed profile that depends on the targeted elevation, resulting in noticeable altitude variations that may increase over print passes.

Hereinafter, at a given stack state, an active pixel is defined as a pixel that still requires other slices with droplets to be jetted on top of it. In other words, the growth of an active pixel is not completed. For a given stack of slices, the "altitude spread" is defined as the difference between the highest active pixel and the lowest active pixel.

For a printing system according to the invention, it is important to ensure that the altitude spread is kept small so that the lowest altitude of active pixels are not too distant from the nozzles (typically 100 or 200 µm) to avoid droplet mispositioning. As a result, the slicer processor can decide to synchronize the growth of pixels by stopping the growth of fastest active pixel to wait for the slowest active pixels to complete their growth. Stopping the growth of a pixel implies that the currently processed layer will not instruct the printer to jet ink at the position of the considered pixel. This will be referred hereinafter as pausing or altitude growth limitation.

Locations in the pass images at which no droplets are ejected, at which the planned height of the corresponding pixel has not yet been reached, i.e. the pixel is an active pixel, and at which there is a transition from a pause to a white droplets volume in the white isolation layer, are candidates for causing contouring artifacts.

According to an embodiment the window comprises a color function for selecting a color for the contour representation in the preview image. This is advantageous, since a color deviating from the average color of the surface of the object in the preview image is more distinguishable for the user who examines the preview image.

According to an embodiment the color function is configured to select a color for the contour representation from a color range from white to black.

According to an embodiment the window comprises a test function for selecting at least one other print strategy for printing the object to create a new preview image for each of the at least one other print strategy and to allow a user to compare the contour representation in the preview image in the window with a possible new contour representation in the new preview image in the window.

According to an embodiment the print control system comprises a comparing section for comparing contour artefacts predicted according to a plurality of print strategies in order to display a suggestion item in the window for a print strategy out of the plurality that results in no contouring artefact or a minimal contouring artefact. A first print strategy may be selected which has a fast layer growth speed but leads to more contouring artefacts. A second print strategy may be selected which has a slow layer growth speed with less contouring artefacts. According to the selected print strategy, the individual pass images may be automatically adjusted.

The present invention also relates to a method for predicting contouring artefacts produced when printing an object having a surface of varying height, the method comprising the steps of establishing a number of pass images for printing of the object on a support in the number of pass images on top of each other, analyzing the pass images in order to predict before printing of the object a location of a contouring artefact at the surface of the object, transforming the predicted location into a contour representation, adding the contour representation to a preview image of the surface of the object, the contour representation being visually distinguishable from the representation of the surface of the object in the preview image, and displaying the preview image including the contour representation in a user interface window.

According to an embodiment of the method the analyzing step comprises the step of detecting before printing of the object intended pause moments in the printing of the pass images, which pause moments influence the contouring artefact, and coupling before printing of the object the intended pause moments to the location of the contouring artefact at the surface of the object.

The present invention also relates to a recording medium comprising computer executable program code configured to instruct a computer to perform a method according to the invention.

BRIEF DESCRIPTION OF THE DRAWINGS

Embodiment examples of the invention will now be described in conjunction with the drawings, wherein.

DETAILED DESCRIPTION OF EMBODIMENTS

Figure 1:
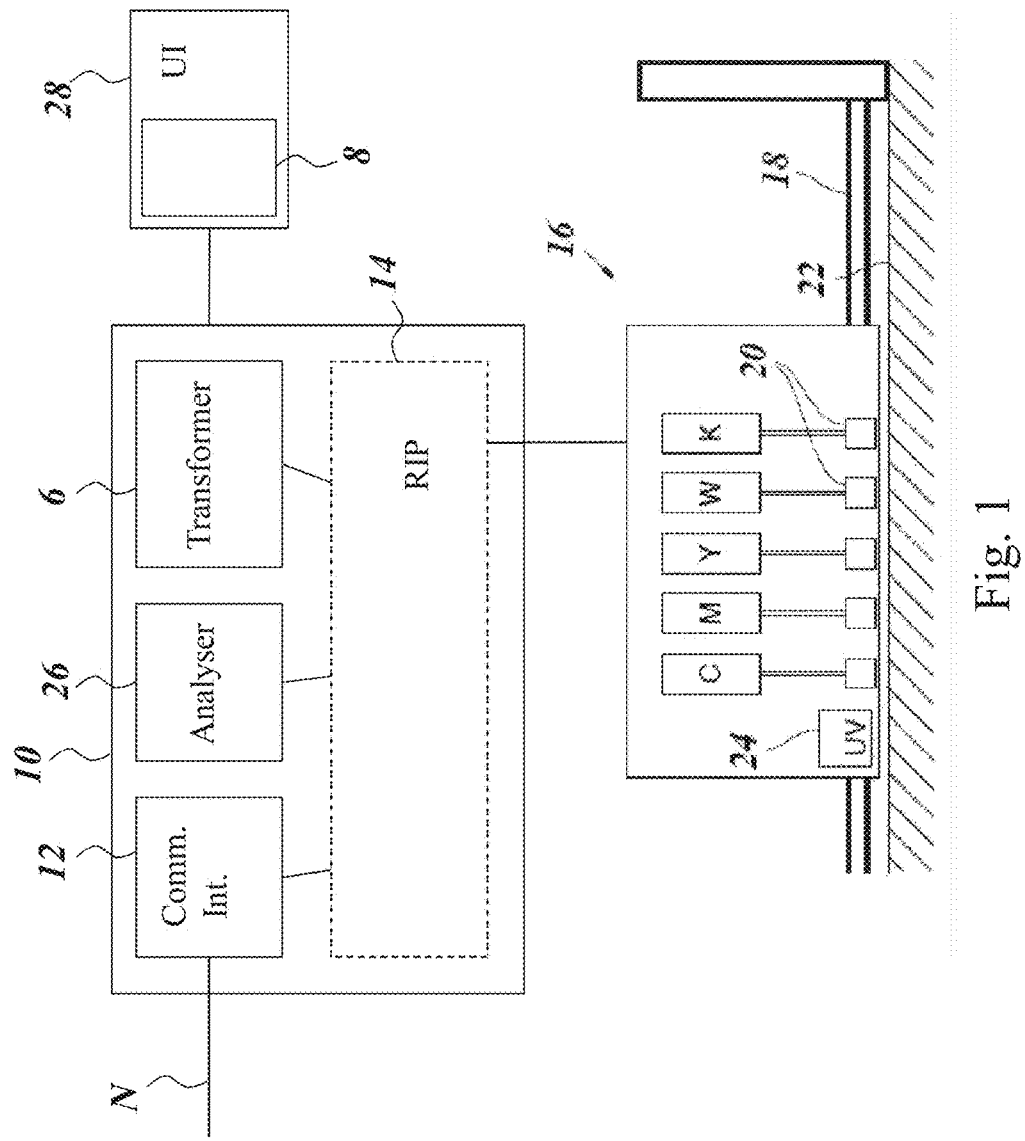
FIG. 1 is a block diagram of a printer control system according to the present invention and a printing system according to the invention.

FIG. 1 schematically shows a print system for printing 3D objects by depositing material on a support 22 in a number of printing passes. A print controller 10 receives print data in the form of a rasterized object image comprising height data, e.g. in the form of a height channel, for indicating a height of each pixel of the rasterized object image, and comprising color data, e.g. in the form of a number of color channels, for indicating a color of each pixel. For example, there are five customary color channels for colorants of the colors cyan (C), magenta (M), yellow (Y), white (V), black (K). The height data specify, for two-dimensional print coordinates X, Y, the height of the respective pixel of the image. The height data describes a height, i.e. a thickness, of the object in the third dimension Z.

The print controller 10 includes a communication interface 12 connected e.g. to a network N for receiving the print data, and a raster image processor 14 configured for converting the print data into a number of pass images in a format suitable for driving a print engine 16 synchronized with a motion control system 18 configured for controlling relative motion between print heads 20 of the print engine 16 and the support 22. The motion control system 18 comprises print carriage motion controllers of first and second printing directions X, Y and, optionally a print carriage height controller Z for controlling a height of the print heads 20 above the support 22. For example, the motion control system 18 is configured to control relative motion between the print heads 20 and the support 22 in the X, Y, and Z direction. The print heads have nozzles for jetting the colorants onto the support 22. The print system is a system for printing relief prints using UV curable ink and includes a UV curing device 24.

According to the present invention the print controller 10 further comprises an analysis section 26 and a transformation section 6, which may be implemented in software and/or hardware. The analysis section 26 is configured to analyze the pass images in order to predict the location of the contouring artifact before printing the object. The transformation section 6 is configured to transform the predicted location into a contour representation to be added to the preview image.

A user interface having a display device 28 is connected to the print controller 10. The display device 28 is arranged to visualize in a window 8 the preview image comprising the representation of the surface of the object before printing the object by means of the print engine 16. The contour representation, when added to the preview image, is visually distinguishable from the representation of the surface of the object in the preview image. The user interface may be a local user interface at the printing system or a remote user interface. The user interface may be wired to the printing system or wirelessly connected to the printing system.

In the following, printing of a 2.5D object will be exemplarily explained with respect to FIGS. 2-7.

Figure 2:
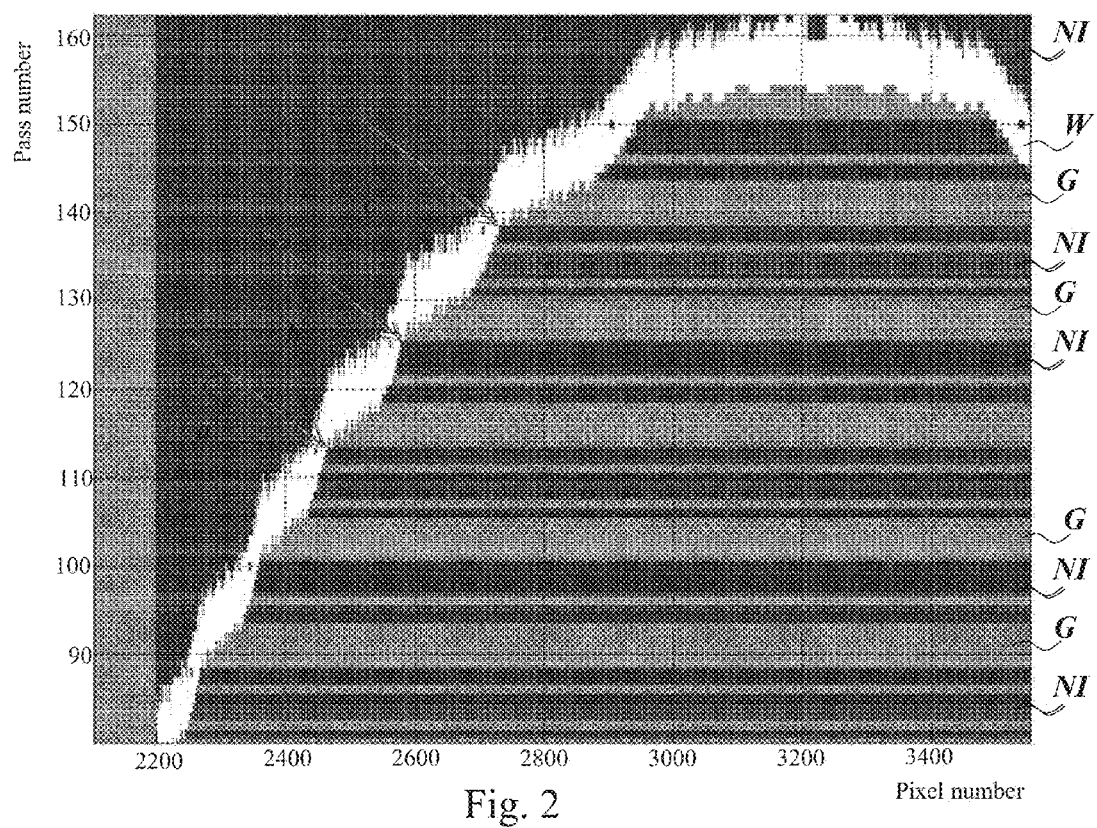
FIGS. 2-3 are schematic illustrations of a relief print for illustrating the present invention.

FIG. 2 is a cross cut of a 2.5D structure printed in a number of printing passes for printing an object. The structure is built up of a number of 163 pass images which are printed on top of each other. FIG. 2 shows a number of pixels numbered 2200-3460 on a horizontal axis and the number of the passes numbered 80-163 on a vertical axis. A number of underground passes 1-79 is not shown in FIG. 2. A first colored area indicated by a color NI represents positions in passes where no ink is deposited. A second colored area indicated by a color W represents positions in passes where white ink is deposited. A third colored area indicated by a color G represents positions in passes where an underground ink is deposited. Arrows a, b, c indicate locations where white ink in a certain pass is deposited on a position having a color NI on the previous pass levels, i.e. in passes previous to the certain pass no ink was deposited. The positions indicated by the arrows a, b, c are places where pausing occurs.

Figure 3:
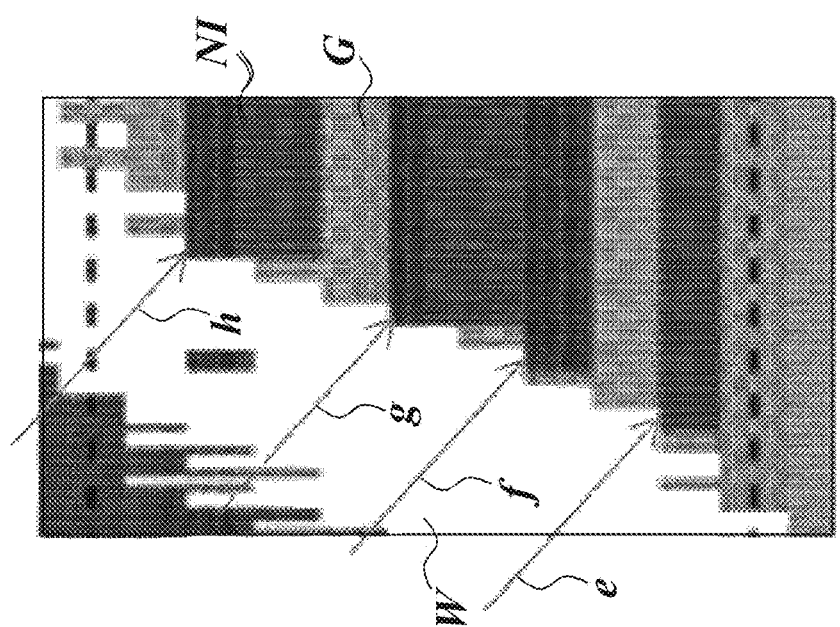

FIG. 3 is a sub-area 300 of FIG. 2 at which is zoomed in. Arrows e, f, g, h, indicate locations at which pausing occurs.

By analyzing the pass images and the locations at which white ink, no ink and underground ink is deposited, the locations a, b, c, e, f, g, h are indentified as locations where pausing occurs, so contouring is attenuated.

Figure 4:
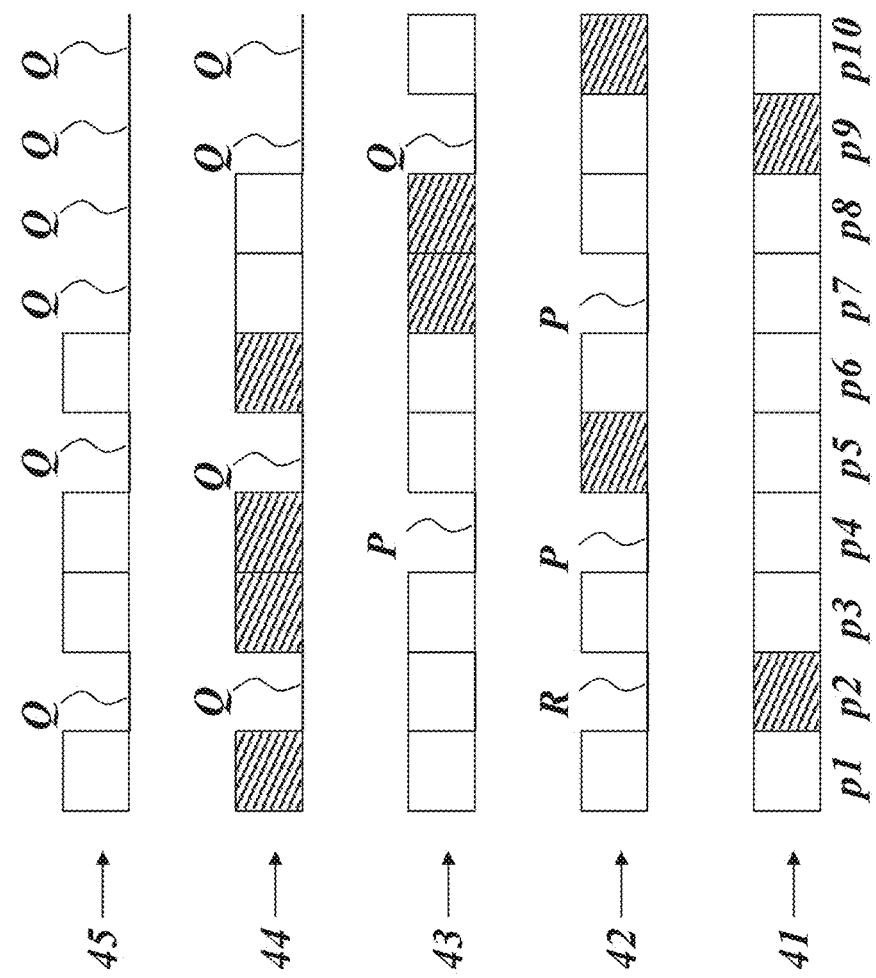
FIGS. 4-7 are schematic simplified illustrations of a relief print for illustrating the present invention.

In FIG. 4 for each pass image 41-45 the volume of droplets per pixel is drawn. For convenience reasons a number of 10 pixels p1-p10 have been drawn on the horizontal axis.

The volume of droplets per pass image is rather constant in the pass images 41-45. White droplets volumes are drawn as hatched rectangles.

At locations in the pass images indicated by the letters P, Q, R no droplets are ejected. Locations indicated by the letter Q are locations in pass images at which no droplets are ejected since the planned height of the corresponding pixel has been reached. The pixels p2, p5, p7, p8, p9, p10 comprise locations indicated by the letter Q.

Locations indicated by the letter R are locations in the pass images at which no droplets are ejected and at which the planned height of the corresponding pixel has been reached except for a surface droplets volume and/or a white droplets volume. The pixel p2 comprises a location indicated by the letter R.

Locations indicated by the letter P are locations in the pass images at which no droplets are ejected, at which the planned height of the corresponding pixel has not yet been reached and at which there is a transition from a pause to a white droplets volume. The pixels p4, p7 comprise locations indicated by the letter P and are candidates pause locations.

Figure 5:
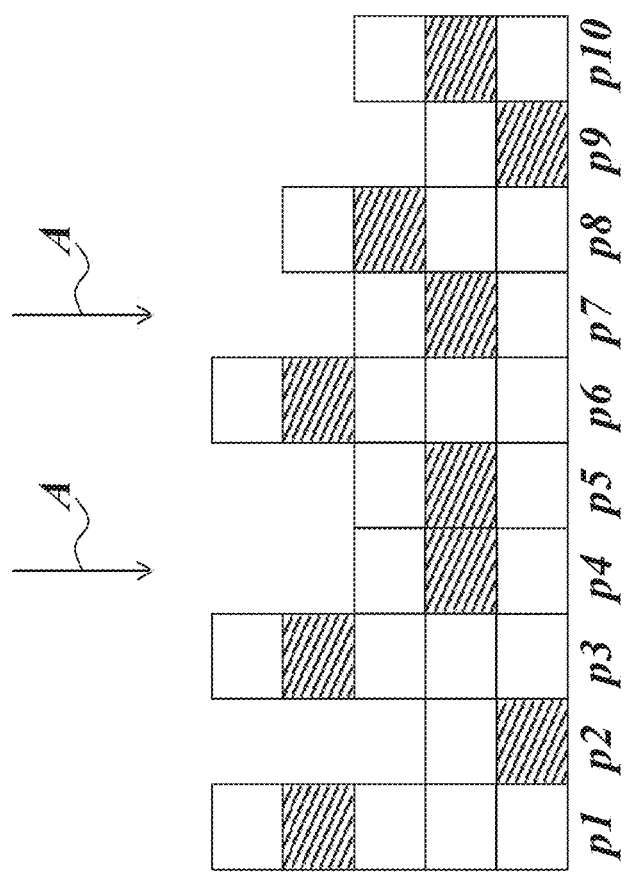

In FIG. 5 the relief intended to be printed by the number of 5 pass images 41-45 according to FIG. 4 is drawn in a stacked way per pixel along a vertical direction. For each pixel p1-p10 stacked volumes are drawn. The size of each volume is corresponding to the height of the ejected volume summarized per pixel. In other words, an inking sequence per pixel p1-p10 is shown in the vertical direction. Arrows A indicate the pixels p4, p7 at which locations pausing occurs.

The thickness of each of the pass images 41-45 is the same. When the thickness of each of the pass images is the same, i.e. the inking sequence of a pixel has a low dispersion, contouring lines may be introduced. Experiments have revealed that, when the inking sequence of a pixel has a low dispersion with respect to the droplets volumes being used, the chance of introducing relief contour lines is rather large. Such a low dispersion is usually a property of a print strategy having a large print speed with a minimum number of layers.

However, in another print strategy the thickness of a pass image may vary per pass image or even per pixel in a pass image. The thickness aspect is shown in FIG. 6.

Figure 6:
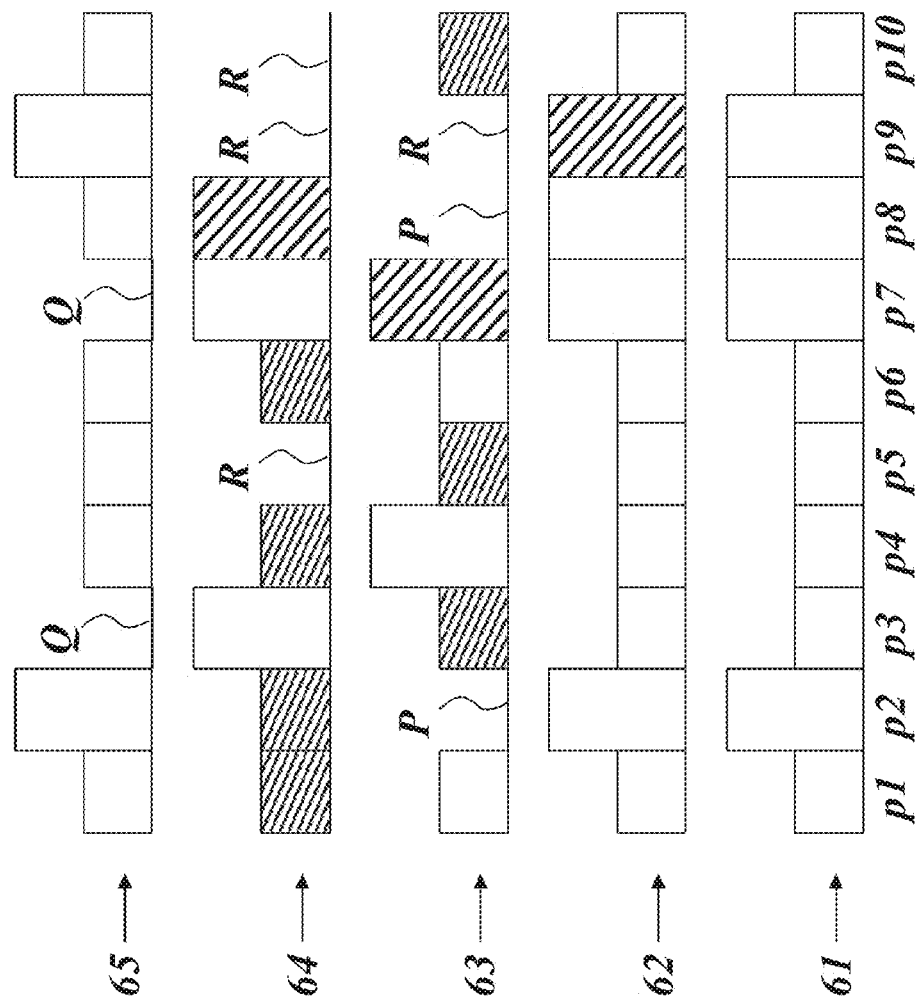

In FIG. 6 for each pass image 61-65 the volume of droplets per pixel is drawn. The volume of droplets per pass image is rather varying in the pass images 61-65. White droplets volumes are drawn as hatched rectangles.

The pass pixel heights of those pass pixels that contribute to the underground layers of the respective pixels may be randomly varied. For example, the pass image 61 comprised pass pixels of relative heights of 15 ED (p1, p3-p6, p10) and 30 ED (p2, p7-p9), the different pass pixel heights being defined in integer multiples of an elementary height unit ED, which e.g. is 1.7 µm.

Each pass image is printed in a single printing pass or printing swath of the print head. When printing a pass image, the amount of printed material, e.g. colorant, that is deposited per printed pass pixel of the pass image is varied in accordance with the pass pixel heights of the pass pixels. The amount of printed material may be varied by varying the number of colorants used as well as varying the amount or volume of colorant that is printed using the respective colorant. For example, for printing a pass pixel of a height of 15 ED, three arbitrary colorants or print heads may be used, each print head ejecting a droplet volume corresponding to 5 elementary droplet volumes.

At locations in the pass images indicated by the letters P, Q, R no droplets are ejected. Locations indicated by the letter Q are locations in pass images at which no droplets are ejected since the planned height of the corresponding pixel has been reached. The pixels p3, p7 comprise locations indicated by the letter Q.

Locations indicated by the letter R are locations in the pass images at which no droplets are ejected and at which the planned height of the corresponding pixel has been reached except for a surface droplets volume and/or a white droplets volume. The pixels p5, p9, p10 comprise locations indicated by the letter R.

Locations indicated by the letter P are locations in the pass images at which no droplets are ejected, at which the planned height of the corresponding pixel has not yet been reached and at which there is a transition from a pause to a white droplets volume. The pixels p2, p8 comprise locations indicated by the letter P. The pixels p2, p8 are candidates for causing contouring artifacts since a dispersion of droplets volumes in an inking sequence of the underground layers for each pixel p2, p8 is low.

Figure 7:
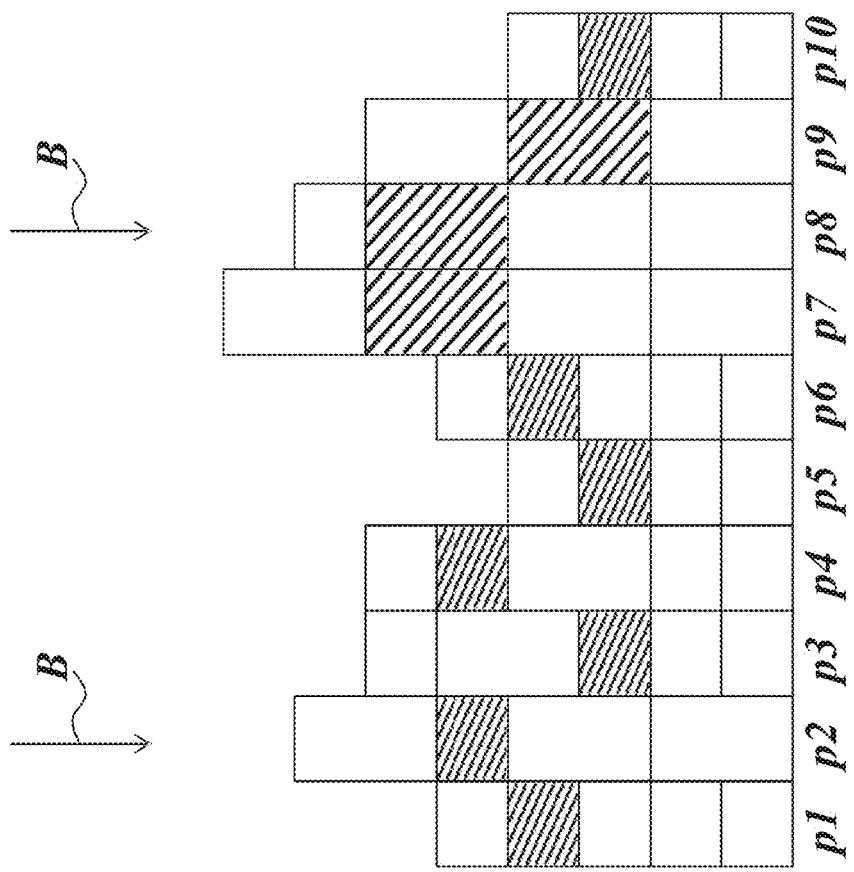

In FIG. 7 the relief intended to be printed by the number of 5 pass images 61-65 according to FIG. 6 is drawn in a stacked way per pixel in a vertical direction. For each pixel p1-p10 stacked volumes are drawn. The size of each volume is corresponding to the height of the ejected volume summarized per pixel. In other words, an inking sequence per pixel p1-p10 is shown in the vertical direction. The inking sequences of the pixels p1, p2, p3, p5, p6, p7, p8, p9, p10 have a low dispersion with respect to the droplets volumes being used in the underground layers, while the inking sequences of the pixel p4 has a larger dispersion.

Contouring artifacts are most likely to occur at the locations indicated by the arrows B of the pixels p2, p8 and most unlikely at the other pixels p1, p3, p4, p5, p6, p7, p9, p10.

According to a further embodiment the dispersion has a low, medium and high dispersion level. For example, a low dispersion level may have n drops volumes of each 25 ED, a medium dispersion level may have n drops volumes of each 25 ED and a superposing drops volume of 15 ED, and a high dispersion level may have n drops volumes of 25 ED, zero or one superposing drops volume of 15 ED and a number of superposing drops volumes of 5 ED.

The pixels having a low and medium dispersion level create contours. The pixels having a large dispersion level do not create contours.

Figure 8:
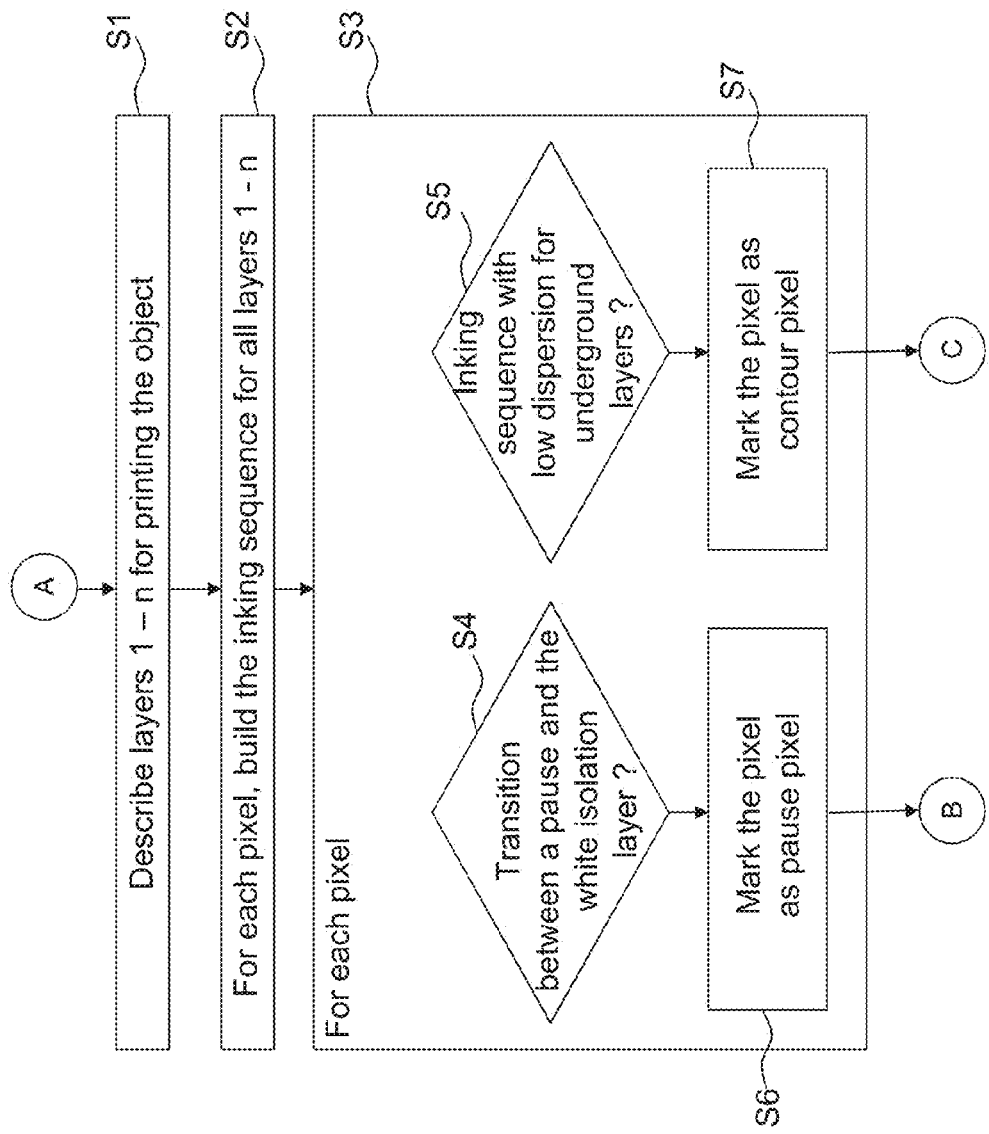
FIGS. 8-9 is a flow diagram illustrating a method of printing an object on a support according to the present invention.
Figure 9:
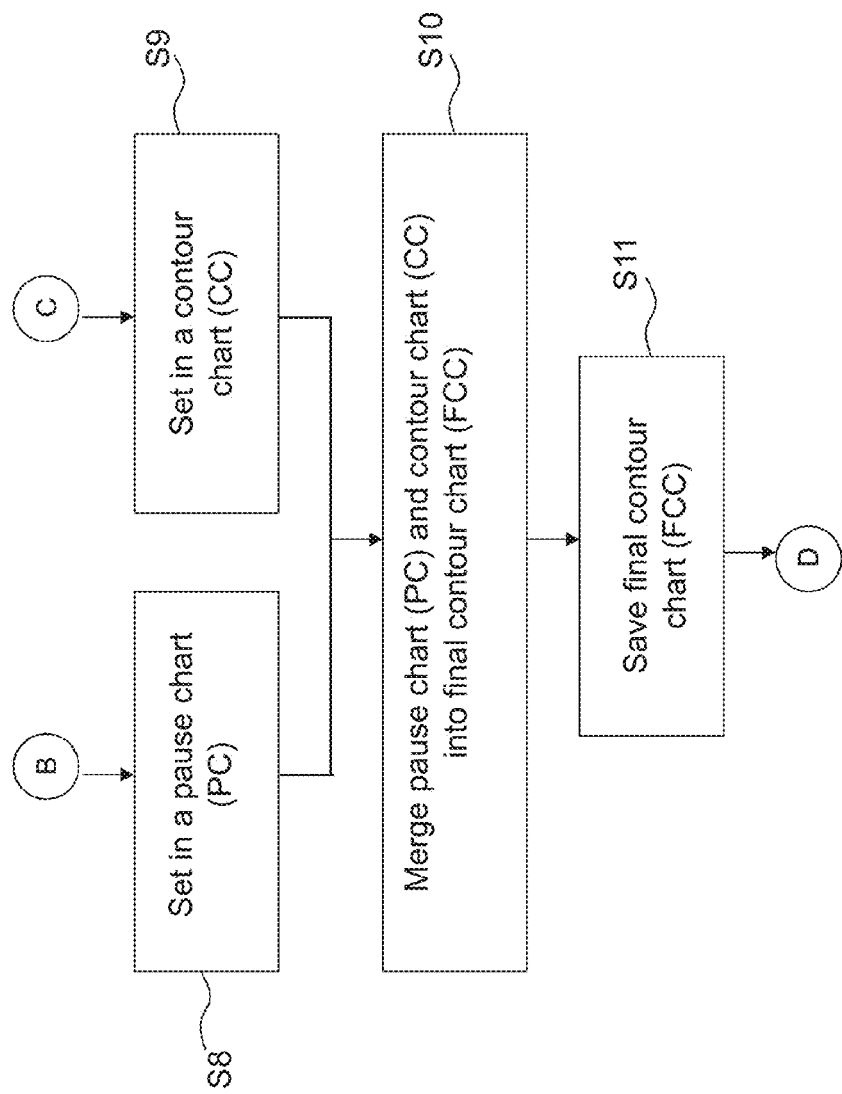

FIGS. 8-9 is a flow diagram of the method according to the invention. The method may be executed by an application program implemented in software and/or hardware residing in the print controller 10 of the printing system according to the invention. Parallel processing may be used. From a starting point A in FIG. 8 a first step S1 is reached.

In the first step S1 the layers for printing the object are described in software. In a second step S2 for each pixel an inking sequence for all layers is built. The first step S1 and S2 may be combined by producing a set of printable layers—but the print data is not sent to the printing system—that indicates for each pixel position and each considered layer, what colorant and what volume will be deposited according to a chosen print mode. Along with all layers being built, the inking sequence with relevant information like pauses and degree of dispersion becomes available.

In a third step S3 for each pixel two decision steps S4, S5 are executed.

In a fourth step S4 it is checked if the pixel is located at a transition from a pause to the white isolation layer. If so, the pixel is marked as a pause pixel in a sixth step S6. The method proceeds to intermediate point B.

In a fifth step S5 it is checked if the inking sequence of the pixel has a low dispersion for the underground layers. If so, the pixel is marked as a contour pixel in a seventh step S7. The method proceeds to intermediate point C.

The method proceeds in FIG. 9. Intermediate points B and C in FIG. 9 correspond to intermediate points B respectively C in FIG. 8.

From intermediate point B the method proceeds to an eighth step S8.

From intermediate point C the method proceeds to a ninth step S9.

In the eighth step S8 a pause chart PC is created for the marked pause pixels. Pause values marked in the sixth step S6 are copied in a pause chart image buffer in storage.

In the ninth step S9 the contour pixels are set in a contour chart CC. Contour values marked in the seventh step S7 are copied in a contour chart image buffer in storage.

Figure 10:
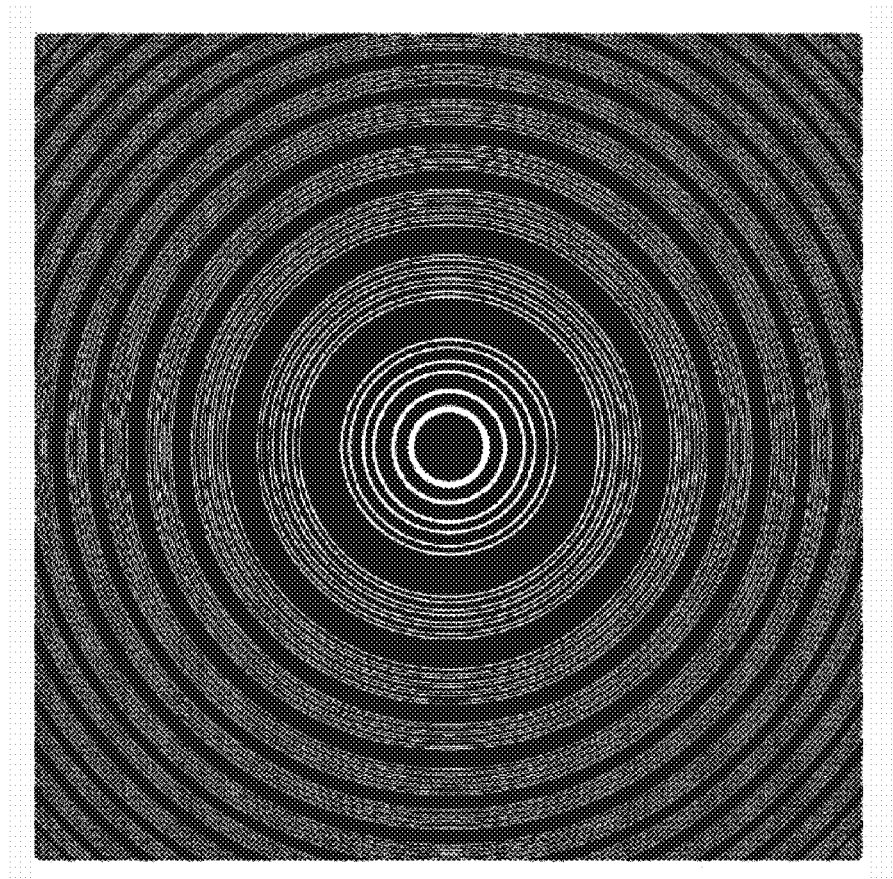
FIG. 10-12 show examples of a final contour chart according to the present invention.
Figure 11:
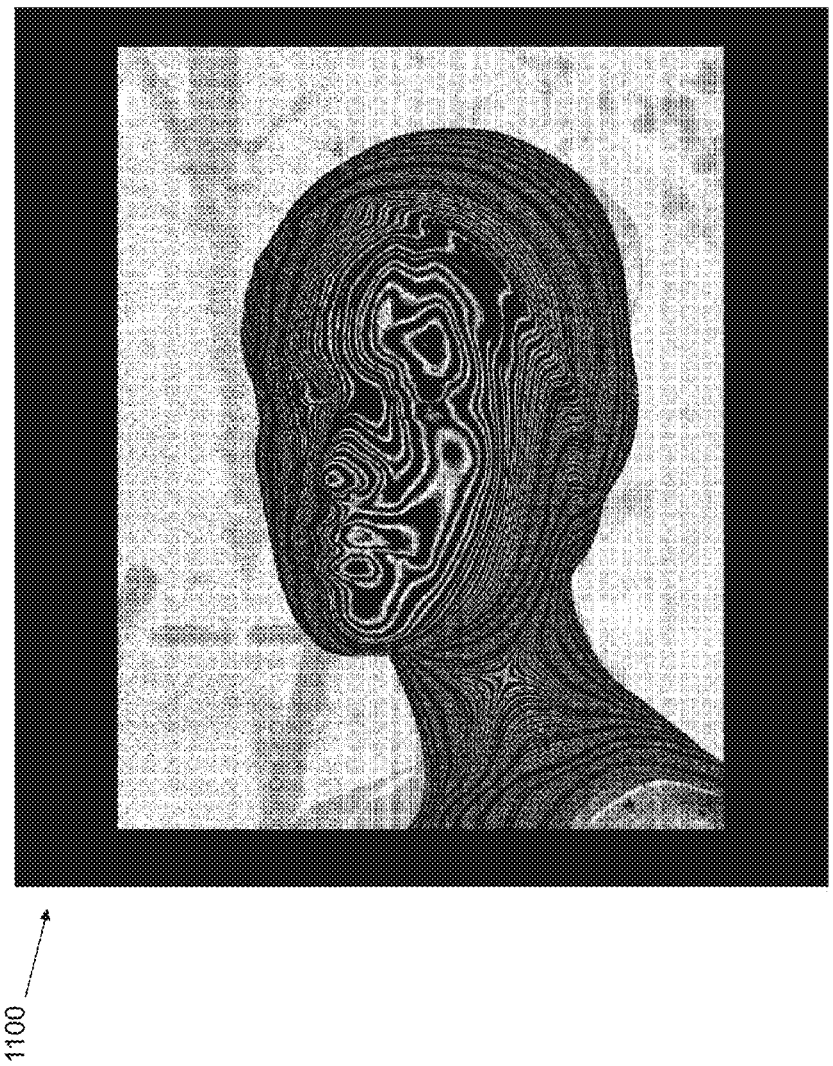

The method leads to a tenth step S10 which merges the pause chart PC and the contour chart CC resulting in a final contour chart FCC. Pause pixels are marked black in the final contour chart (FCC). Contour pixels are marked white in the final contour chart. When merging the black marked pause pixels and the white marked contour pixels, a black pixel marked as "paused" overwrites a white pixel marked as "contour". Examples of final contour charts 1000, 1100, 1200 are shown in FIG. 10, 11, 12 respectively.

In an eleventh step S11 the final contour chart is saved in memory of the print controller 10 of the printing system according to the invention.

The steps S2-S7 are performed by the analysis section according to the invention.

The steps S8-S11 are performed by the transformation section according to the invention.

The method ends in an end point D.

The transformation section according to the invention transforms the predicted locations into the final contour chart according to the steps S8-S11. The transformation section also adds the final contour chart to the preview image. The final contour chart is visually distinguishable from the representation of the surface of the object in the preview image. The addition of the final contour chart to the representation of the surface of the object in the preview image may by realized by means of a bump mapping technique which will be elucidated hereinafter.

The final contour chart may be used in a 3D viewer as basis for the bump mapping technique. The bump mapping technique is a shading technique used in video game or movies animation to render elevated textures on a 3D object. The technique uses a normal map derived from the height map to compute a reflexion of a light ray given the relief surface.

Figure 12:
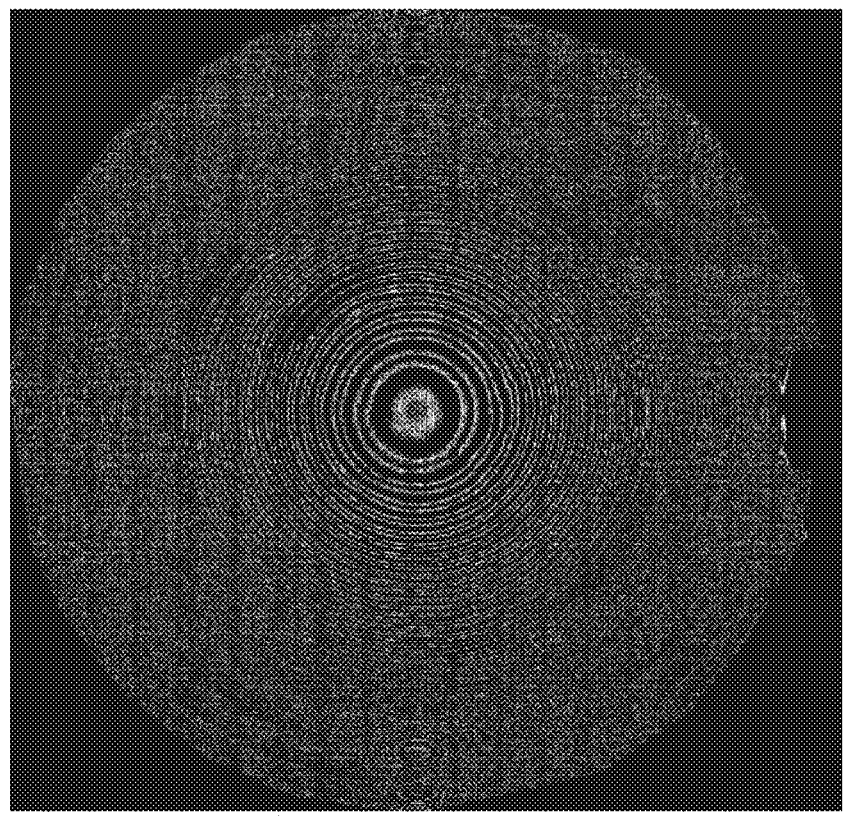
Figure 13:
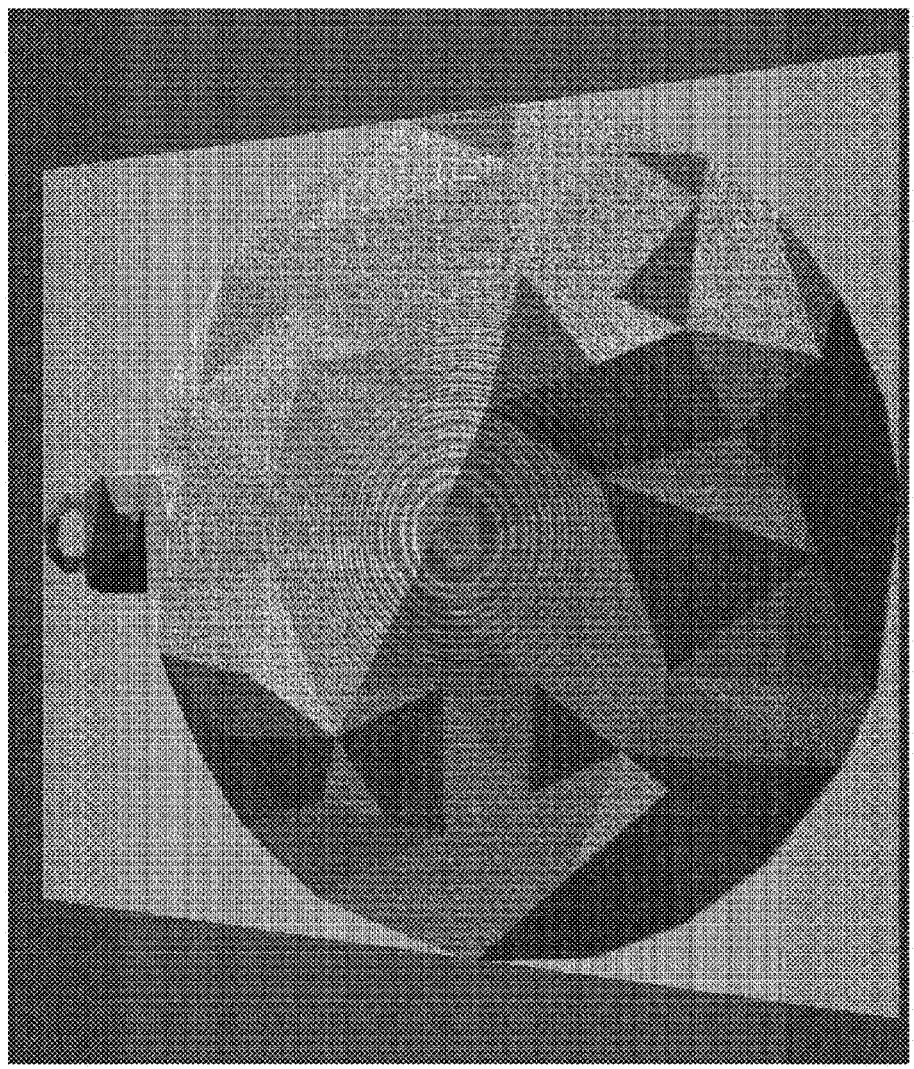
FIG. 13 shows an example of a preview image including the final contour chart.

The normal map may be derived from the final contour chart and can be used for a bump mapping shader to render the relief contour artefact lines on a 3D model of the relief design. An example of a 3D viewer screenshot 1300 is shown in FIG. 13 in which the contours of the final contour chart shown in FIG. 12 are rendered using the bump mapping technique.

However, the invention is not limited to the bump mapping technique; other shading techniques based on the final contour chart may be used.

Figure 14:
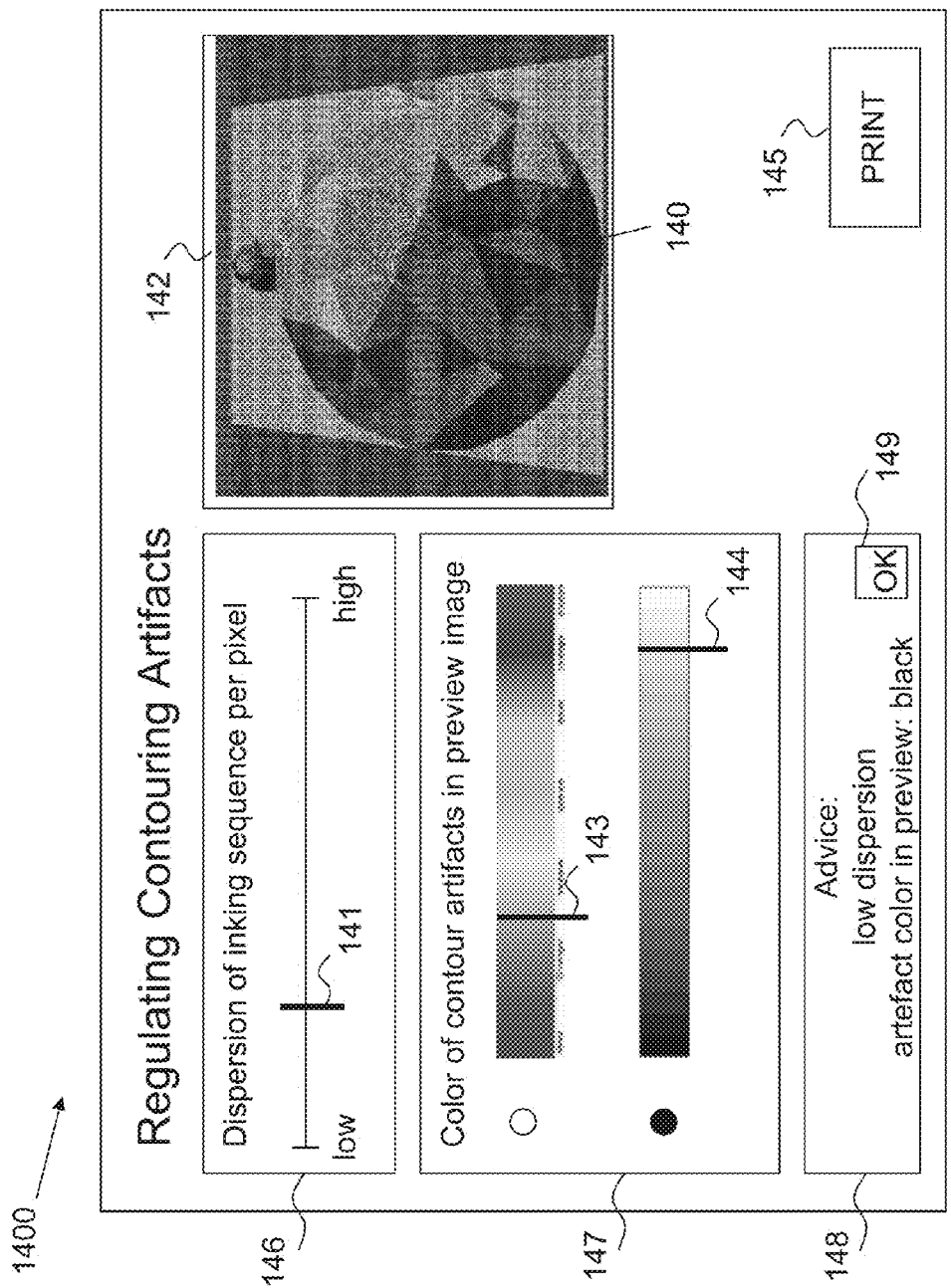
FIG. 14 is a window of a user interface according to the present invention for regulating contouring artifacts.

FIG. 14 shows a user interface window 1400 for the operator or user to regulate the contouring artefacts before printing the object and to adjust a preview image including the predicted contouring artefacts.

The window 1400 comprises a color function 147 for selecting a color for the contour representation in the preview image in a preview area 142. A color may be selected from a color spectrum band with a first slider 143 or from a grey tone band with a second slider 144 by means of toggling between two radio buttons in front of the color spectrum band and the grey tone band respectively in the color function 147. When moving the first slider 143 or the second slider 144, a color of the predicted contouring artefacts 140, if any, in the preview image in the preview area 142 will be automatically changed accordingly.

The window 1400 comprises a test function 146 for selecting a print strategy for printing the object to create a new preview image for the selected print strategy and to allow a user to compare the contour representation of a preview image in the preview image area 142 in the window 1400 with a possible new contour representation in the new preview image in the preview image area 142 of the window 1400. A print strategy may be selected by means of a third slider 141 which adjusts a degree of dispersion on the inking sequences per pixel. When moving the third slider 141, the contouring artefacts 140, if any, are recalculated by the steps S1-S11 of the method by the print controller and the preview image including the recalculated contouring artefacts will be automatically adjusted accordingly.

According to an embodiment the print control system comprises a comparing section for comparing contour artefacts predicted according to a plurality of print strategies in order to display a suggestion item 148 in the window 1400 for a print strategy out of the plurality that results in no contouring artefact or a minimal contouring artefact. When the user or operator wants to follow the advice suggested in the suggestion item 148 by the print control system, he may press an OK button 149 in the suggestion item 148.

When the user or operator has finally reached a satisfactory regulation of the contouring artefacts 140, he may press a PRINT button 145 on the window 1400 in order to print the object by the printing system according to the invention.

The invention claimed is:

1. A printer control system for controlling the printing of an object on a support by stacking layers of material on top of each other, each layer derived from a pass image, the object having a surface of varying height, the printer control system comprising
a user interface having a display device and arranged to visualize in a window on the display device a preview image before printing of the object, the preview image comprising a representation of the surface of the object,
wherein the printer control system comprises
an analysis section which is configured to analyze the pass images in order to predict before printing the object a location of a contouring artefact leading to a stair case or contouring effect at the surface of the object and to create a binary image that represents the contouring artefact leading to the stair case or contouring effect as viewed from a top of the object, and
a transformation section which is configured to add the binary image at the predicted location as a contour representation to the preview image, the contour representation being visually distinguishable from the representation of the surface of the object in the preview image,
wherein the analysis section comprises a detection section for detecting before printing of the object intended pause moments in the printing of the pass images, which pause moments are caused during printing by no material deposition at a location in a layer according to the pass image corresponding to the layer or by a variation in an amount of material deposited at the location in a layer with respect to previous layers, and influence the contouring artefact, and the analysis section is configured to couple before printing of the object the intended pause moments to the location of the contouring artefact at the surface of the object.

2. The printer control system according to claim 1, wherein the window comprises a color function for selecting a color for the contour representation in the preview image.

3. The printer control system according to claim 2, wherein the color function is configured to select a color for the contour representation from a color range from white to black.

4. The printer control system according to claim 1, wherein the window comprises a test function for selecting at least one other print strategy for printing the object to create a new preview image for each of the at least one other print strategy and to allow a user to compare the contour representation in the preview image in the window with a possible new contour representation in the new preview image in the window.

5. The printer control system according to claim 4, wherein the print control system comprises a comparing section for comparing contour artefacts predicted according to a plurality of print strategies in order to display a suggestion item in the window for a print strategy out of the plurality that results in no contouring artefact or a minimal contouring artefact.

6. A printing system for printing of an object on a support in a number of pass images on top of each other, the object having a surface of varying height, the printing system comprising a printer control system according to claim 1.

7. A method for predicting contouring artefacts produced when printing an object having a surface of varying height, the method comprising the steps of
- establishing a number of pass images for printing of the object on a support in a number of layers corresponding to the number of pass images on top of each other,
- analyzing the pass images in order to predict before printing of the object a location of a contouring artefact leading to a stair case or contouring effect at the surface of the object and to create a binary image that represents the contouring artefact leading to the stair case or contouring effect as viewed from a top of the object,
- transforming the predicted location into a contour representation by adding the binary image at the predicted location to a preview image of the surface of the object, the contour representation being visually distinguishable from the representation of the surface of the object in the preview image, and
- displaying the preview image including the contour representation in a user interface window,
- wherein the analyzing step comprises the step of detecting before printing of the object intended pause moments in the printing of the pass images, which pause moments are caused during printing by no material deposition at a location in a layer according to the pass image corresponding to the layer or by a variation in an amount of material deposited at the location in the layer with respect to previous layers, and influence the contouring artefact, and coupling before printing of the object the intended pause moments to the location of the contouring artefact at the surface of the object.

8. A non-transitory computer readable recording medium comprising computer executable program code configured to instruct a computer to perform any of the methods according to claim 7.

9. The printer control system according to claim 1, wherein the window comprises a color function for selecting a color for the contour representation in the preview image; and a test function for selecting at least one other print strategy for printing the object to create a new preview image for each of the at least one other print strategy and to allow a user to compare the contour representation in the preview image in the window with a possible new contour representation in the new preview image in the window, and
- wherein the window includes a slider configured to adjust a degree of dispersion on inking sequences per pixel, and a movement of the slider causes the contouring artefacts to be recalculated and the preview image including the recalculated contouring artefacts is automatically adjusted accordingly.

* * * * *